US010038639B2

(12) United States Patent
Francini et al.

(10) Patent No.: US 10,038,639 B2
(45) Date of Patent: Jul. 31, 2018

(54) CONGESTION CONTROL BASED ON FLOW CONTROL

(71) Applicants: Andrea Francini, Chapel Hill, NC (US); Stepan Kucera, Dublin (IE); Sameerkumar Sharma, Holmdel, NJ (US); Joseph D. Beshay, Richardson, TX (US)

(72) Inventors: Andrea Francini, Chapel Hill, NC (US); Stepan Kucera, Dublin (IE); Sameerkumar Sharma, Holmdel, NJ (US); Joseph D. Beshay, Richardson, TX (US)

(73) Assignees: Alcatel Lucent, Boulogne-Billancourt (FR); Nokia of America Corporation, Murray Hill, NJ (US)

( * ) Notice: Subject to any disclaimer, the term of this patent is extended or adjusted under 35 U.S.C. 154(b) by 43 days.

(21) Appl. No.: 15/268,023

(22) Filed: Sep. 16, 2016

(65) Prior Publication Data
US 2018/0083878 A1     Mar. 22, 2018

(51) Int. Cl.
*H04L 12/801*     (2013.01)
(52) U.S. Cl.
CPC ............ *H04L 47/12* (2013.01); *H04L 47/11* (2013.01)
(58) Field of Classification Search
CPC ........ H04L 47/12; H04L 47/11; H04L 67/02; H04L 65/80; H04W 24/08; G06F 3/067; G06F 3/0619
See application file for complete search history.

(56) References Cited

U.S. PATENT DOCUMENTS

| 2005/0198384 A1* | 9/2005 | Ansari | H04W 36/0011 709/245 |
| 2007/0112962 A1* | 5/2007 | Lewontin | H04L 69/16 709/227 |

(Continued)

OTHER PUBLICATIONS

Kostopoulos, et al., "Scenarios for 5G Networks: The Coherent Approach," Proceedings of 23rd International Conference on Telecommunications (ICT '16), Thessaloniki (Greece), May 2016, 6 pages.

(Continued)

*Primary Examiner* — Walli Butt
(74) *Attorney, Agent, or Firm* — Tong, Rea, Bentley & Kim, LLC

(57) ABSTRACT

The present disclosure generally discloses a congestion control capability for use in communication systems (e.g., to provide congestion control over wireless links in wireless systems, over wireline links in wireline systems, and so forth). The congestion control capability may be configured to provide congestion control for a transport flow of a transport connection, sent from a transport flow sender to a transport flow receiver, based on flow control associated with the transport flow. The transport flow may traverse a flow queue of a link buffer of a link endpoint. The link endpoint may provide to the transport flow sender, via an off-band signaling channel, an indication of the saturation state of the flow queue of the transport flow. The transport flow sender may control transmission of packets of the transport flow based on the indication of the saturation state of the flow queue of the transport flow.

20 Claims, 8 Drawing Sheets

(56) References Cited

U.S. PATENT DOCUMENTS

| | | | | |
|---|---|---|---|---|
| 2014/0098668 | A1* | 4/2014 | Kakadia | H04L 47/30 370/235 |
| 2015/0089500 | A1* | 3/2015 | Kompella | H04L 43/18 718/1 |
| 2015/0189009 | A1* | 7/2015 | van Bemmel | H04L 67/1008 709/226 |
| 2017/0289047 | A1* | 10/2017 | Szilagyi | H04L 47/20 |

OTHER PUBLICATIONS

Balakrishnan, et al., "Improving TCP/IP Performance Over Wireless Networks," Proceedings of ACM First Conference on Mobile Computing and Networking (MobiCom '95), Berkeley (CA), Nov. 1995, 10 pages.

Floyd, et al., "Random Early Detection Gateways for Congestion Avoidance," IEEE/ACM Transactions on Networking, vol. 1(3), Aug. 1993, pp. 397-413, 22 pages.

Nichols, et al., "Controlling Queue Delay," ACM Queue, vol. 10(5), May 2012, pp. 20-34.

Pan, et al., "PIE: A Lightweight Control Scheme to Address the Bufferbloat Problem," Proceedings of IEEE 14th International Conference on High Performance Switching and Routing (HPSR '13), Taipei (Taiwan), Jul. 2013, 8 pages.

Bondarenko, et al., "Ultra-Low Delay for All: Live Experience, Live Analysis," Proceedings of the ACM 7th International Conference on Multimedia Systems (MMSys '16), Klagenfurt (Austria), May 2016, 4 pages.

Kunniyur, et al., "End-to-End Congestion Control Schemes: Utility Functions, Random Losses, and ECN Marks," Proceedings of IEEE 19th Conference on Computer Communications (INFOCOM '00), Tel Aviv (Israel), Mar. 2000, 10 pages.

Ait-Hellal, et al., "Analysis of TCP Vegas and TCP Reno," Proceedings of IEEE 1997 International Conference on Communications (ICC '97), Montreal Canada, Jun. 1997.

Ha, et al., "CUBIC: A New TCP-Friendly High-Speed TCP Variant," Operating Systems Review, vol. 42(5), Jul. 2008, pp. 64-74, 11 pages.

Gerla, et al., "TCP Westwood: Congestion Window Control Using Bandwidth Estimation," Proceedings of IEEE 2001 Global Telecommunications conference (GLOBECOM '01), San Antonino TX, Nov. 2001.

Jin, et al., "Fast TCP: Motivation, Architecture, Algorithms, and Performance," Proceedings of IEEE 23th Conference on Computer Communications (INFOCOM '04), Hong Kong (China), Mar. 2004, 12 pages.

Tan, et al., "A Compound TCP Approach for High-Speed and Long Distance Networks," Proceedings of IEEE 25th International Conference on Computer Communications (INFOCOM '06), Barcelona Spain, Apr. 2006.

Alizadeh, et al., "Data Center TCP (DCTCP)," Proceedings of ACM 2010 SIGCOMM Conference on Applications, Technologies, Architectures, and Protocols for Computer Communications (SIGCOMM '10), New Delhi, India, Aug. 2010, 12 pages.

Briscoe, et al., "Low Latency, Low Loss, Scalable Throughput (L4S) Internet Service: Problem Statement," IETF Internet Draft draft-briscoe-tsvwg-aqm-tcpm-rmcat-I4s-problem-02, Jul. 2016, 28 pages.

Fiorenzi, et al., "Enhancing TCP Over HSDPA by Cross-Layer Signaling," Proceedings of the 2007 IEEE Global Communications Conference (GLOBECOM '07), Washington (DC), Nov. 2007, 5 pages.

Lu, et al., "CQIC: Revisiting Cross-Layer Congestion Control for Cellular Networks," Proceedings of the 16th ACM International Workshop on Mobile Computing Systems and Applications (HotMobile '15), Santa Fe (NM), Feb. 2015. 6 pages.

Jain, et al., "Mobile Throughput Guidance Inband Signaling Protocol," IETF Internet Draft draft-flinck-mobile-throughput-guidance-03, Mar. 2016. 20 pages.

* cited by examiner

US 10,038,639 B2

CONGESTION CONTROL BASED ON FLOW CONTROL

TECHNICAL FIELD

The present disclosure relates generally to wireless communication networks and, more particularly but not exclusively, to congestion control in wireless communication networks.

BACKGROUND

Fifth Generation (5G) wireless systems are expected to use a variety of innovations that may be potentially disruptive to wireless access, such as new air interfaces, split link architectures that separate base-band processing and radio heads, virtualization of functions in general-purpose processors, and flexible chaining of virtualized functions in network slices tailored to the specific needs of diverse services. Besides new use cases and market verticals, 5G should open the mobile broadband network to throughput-intensive interactive (TII) applications, which present the most challenging combination of requirements on throughput (very high) and queuing delay (very low). TII applications typically rely on the Transmission Control Protocol (TCP) for end-to-end transport; however, it appears that existing TCP congestion control mechanisms may not be sufficient to meet all of the requirements of TII applications in 5G. Furthermore, existing TCP congestion control mechanisms may also be problematic for various other applications traversing various other types of wireless links (e.g., Fourth Generation (4G) Long Term Evolution (LTE) wireless links, Wi-Fi links, or the like).

SUMMARY

The present disclosure generally discloses congestion control in wireless communication systems.

In at least some embodiments, an apparatus is provided. The apparatus includes a processor and a memory communicatively connected to the processor. The processor is configured to receive, by a transport flow sender of a transport connection between the transport flow sender and a transport flow receiver, packets of a transport flow that are intended for delivery to the transport flow receiver of the transport connection. The processor is configured to receive, by the transport flow sender via an off-band signaling channel between a link endpoint of a network link and the transport flow sender, an indication of a saturation state of a flow queue for the transport flow in a link buffer associated with the network link. The processor is configured to control, by the transport flow sender based on the indication of the saturation state of the flow queue for the transport flow in the link buffer associated with the network link, transmission of packets of the transport flow.

In at least some embodiments, a method is provided. The method includes receiving, by a transport flow sender of a transport connection between the transport flow sender and a transport flow receiver, packets of a transport flow that are intended for delivery to the transport flow receiver. The method includes receiving, by the transport flow sender via an off-band signaling channel between a link endpoint of a network link and the transport flow sender, an indication of a saturation state of a flow queue for the transport flow in a link buffer associated with the network link. The method includes controlling, by the transport flow sender based on the indication of the saturation state of the flow queue for the transport flow in the link buffer associated with the network link, transmission of packets of the transport flow.

In at least some embodiments, an apparatus is provided. The apparatus includes a processor and a memory communicatively connected to the processor. The processor is configured to receive, by a link endpoint comprising a link buffer supporting a flow queue for a transport flow of a transport connection between a transport flow sender and a transport flow receiver, packets of the transport flow. The processor is configured to monitor a saturation state of the flow queue for the transport flow of the transport connection. The processor is configured to send, from the link endpoint toward the transport flow sender via an off-band signaling channel, an indication of the saturation state of the flow queue for the transport flow of the transport connection.

In at least some embodiments, a method is provided. The method includes receiving, by a link endpoint including a link buffer supporting a flow queue for a transport flow of a transport connection between a transport flow sender and a transport flow receiver, packets of the transport flow. The method includes monitoring a saturation state of the flow queue for the transport flow of the transport connection. The method includes sending, from the link endpoint toward the transport flow sender via an off-band signaling channel, an indication of the saturation state of the flow queue for the transport flow of the transport connection.

BRIEF DESCRIPTION OF THE DRAWINGS

The teachings herein can be readily understood by considering the following detailed description in conjunction with the accompanying drawings, in which.

DETAILED DESCRIPTION

The present disclosure generally discloses a congestion control capability. The congestion control capability may be configured to provide congestion control in communication systems. For example, the congestion control capability may be configured to provide congestion control over wireless links in wireless communication systems (e.g., Fifth Generation (5G) wireless communication systems, Fourth Generation (4G) wireless communications systems, or the like), over wireline links in wireline communications systems, or the like, as well as various combinations thereof. The congestion control capability may be configured to provide congestion control for transport flows in communication systems based on flow control associated with the transport flows. For example, the congestion control capability may be configured to provide congestion control based on use of various congestion control mechanisms (e.g., Transmission Control Protocol (TCP) congestion control mechanisms or other congestion control mechanisms configured to provide congestion control for transport flows). Various embodiments of the congestion control capability are primarily presented herein within the context of 5G wireless communication systems as certain characteristics of 5G wireless communication systems may be configured to facilitate use of the congestion control capability; however, as noted above, various embodiments of the congestion control capability may be configured to provide congestion control in other types of wireless communication systems, in wireline communications systems, or the like, as well as various combinations thereof. For example, various embodiments of the congestion control capability may be configured to leverage the flexibility of the mobile edge cloud (MEC) of 5G wireless communication systems, in order to provide congestion control based on flow control, to support a native TCP congestion control mechanism for 5G in which flow control alone is sufficient to lock the transmission rate of the data source to the available bandwidth of the wireless link. Various embodiments of the congestion control capability may be configured to leverage network slicing supported in 5G wireless communication systems in order to selectively control application of congestion control based on flow control (e.g., only to TII applications or other types of applications which may benefit from congestion control based on flow control), thereby making application of the congestion control capability more scalable. These and various other embodiments and advantages of the congestion control capability may be further understood by way of reference to the 5G wireless communication system of FIG. 1.

Figure 1:
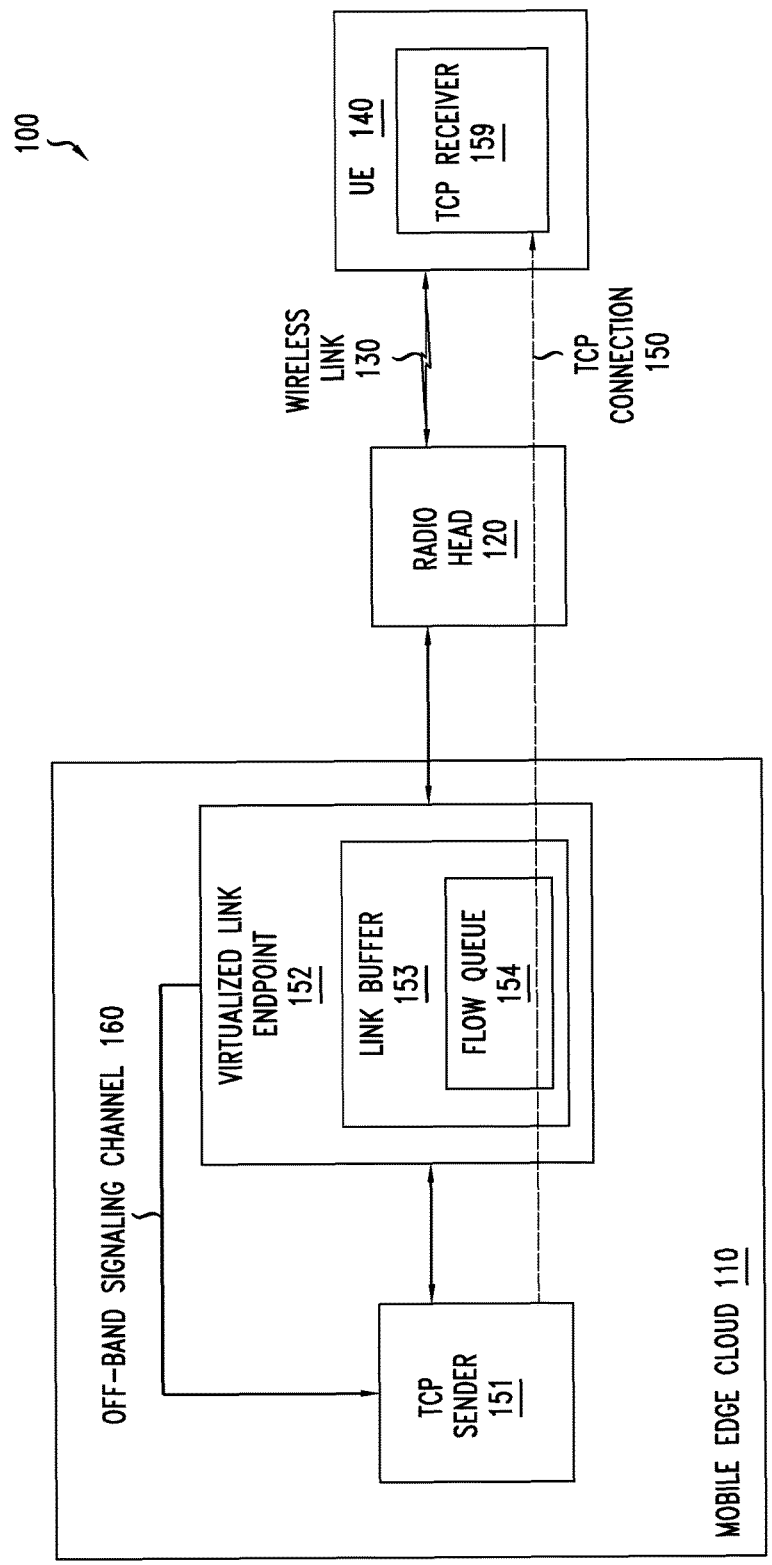
FIG. 1 depicts a 5G wireless communication system configured to support congestion control on wireless links.

FIG. 1 depicts a 5G wireless communication system configured to support congestion control on wireless links.

The 5G wireless communication system 100 includes a mobile edge cloud (MEC) 110, a radio head (RH) 120, a wireless link (WL) 130, and a user equipment (UE) 140.

The MEC 110 is configured to provide radio access network (RAN) functions for supporting wireless communications of UE 140 via RH 120 and associated WL 130. The RAN functions may include various authentication functions, scheduling functions, or the like. The RAN functions may be provided using various cloud-based capabilities, such as resource sharing, virtualization functions, or the like, as well as various combinations thereof. The MEC 110 may be configured to provide various other RAN functions based on various other cloud-based capabilities.

The RH 120 and associated WL 130 are configured to support wireless communications of UE 140. The RH 120 is configured to provide a wireless point of access for UE 140. The RH 120 supports the WL 130, which provides an air interface for wireless communications via RH 120. The RH 120 and the associated WL 130 may support downlink (DL) wireless communications to UE 140 and uplink (UL) wireless communications from UE 140. The RH 120 may be communicatively connected to the MEC 110 via various backhaul connections.

The UE 140 may be any suitable type of wireless end device which may communicate wirelessly via RH 120 and MEC 110. For example, the UE 140 may be a wireless user device (e.g., a smartphone, a tablet computer, a laptop computer, or the like), a machine-type-communication (MTC) device or Internet-of-Things (IoT) device (e.g., a sensor, an appliance, or the like), or the like.

It will be appreciated that 5G wireless communication system 100, although primarily presented for purposes of clarity as including only a single MEC 110, a single RH 120, a single WL 130, and a single UE 140, may include various other numbers MECs 110, RHs 120, WLs 130, and UEs 140. For example, MEC 110 may serve multiple RHs 120. For example, RH 120 may support multiple WLs 130. For example, RH 120 may support multiple UEs 140. It is noted that various other arrangements are contemplated.

The 5G wireless communication system 100 may be configured to leverage various capabilities proposed for 5G systems.

For example, 5G systems are expected to combine a broad spectrum of new technologies to deliver unprecedented capabilities to end users and network operators. For example, new wireless links are expected to provide seamless connectivity at gigabit-per-second (Gb/s) rates and sub-millisecond latencies. For example, leaner protocols for sporadic data exchanges are expected to facilitate pervasive use of machine-type communications, thereby enabling entirely new families of network applications and use cases. For example, split link architectures are expected to make the access network easier to operate and maintain. For example, link-layer functions are expected to migrate from dedicated on-site hardware to general-purpose processors in distributed MEC data centers (illustratively, the MEC 110), thereby supporting elastically adjusting the allocation of computing resources based on traffic load, seamlessly controlling the capabilities of individual functions, flexibly combining functions into network slices that are tailored to support the unique needs of specific applications, and so forth.

For example, 5G systems, by supporting wider and shorter access links, are expected to create the conditions for spawning a new generation of mobile broadband applications. For example, various new applications (e.g., in addition to ordinary mobile Internet access and other existing applications) may be realized within 5G systems. For example, such new applications may include throughput-intensive interactive (TII) applications, which may include various types of applications, which may include applications with a variety of purposes (e.g., work, health, social, entertainment, or the like), which may include applications running on dedicated devices for augmented-reality (AR)/virtual-reality (VR) immersion, and so forth. It will be appreciated that, besides large throughput and low latency, such applications typically require capabilities such as reliable data transfer (e.g., all transmitted data packets are delivered, in the same order, to the intended recipient) and elasticity (e.g., the rate of the data stream adjusts to the bandwidth variations of the end-to-end data path). In existing wireless systems, applications typically find these types of capabilities in transmission control mechanisms such as TCP.

The 5G wireless communication system 100 may be configured to support improved transmission control mechanisms to ensure that application performance of such applications grows consistently with the bandwidth and latency profiles of the new access links of 5G systems. The improved transmission control mechanisms may include improved congestion control mechanisms, as well as other types of transmission control mechanisms which may be employed for this purpose. The improved transmission control mechanisms may include improved TCP mechanisms (e.g., where TCP is used for transmission control within 5G systems), new transmission control mechanisms (e.g., where TCP is not used for transmission control in 5G systems or is supplemented within 5G systems), or the like, as well as various combinations thereof. It is noted that, for purposes of clarity, it is assumed that a version of TCP will be used for transmission control in 5G systems (and, thus, various embodiments presented herein are primarily described within the context of TCP and TCP congestion control mechanisms).

The 5G wireless communication system 100, as noted above, may be configured to support improved TCP congestion control mechanisms, to ensure that application performance of such applications grows consistently with the bandwidth and latency profiles of the new access links of 5G systems, given the unique challenges that 5G wireless links pose to the performance of TCP congestion control. For example, a 5G wireless link may pose a challenge to the performance of TCP congestion control, because the quality of the physical channel between transmitter and receiver is subject to continuous variations which may cause instability of the data rate available to the TCP flow (also known as the link fair share) and which also can induce non-congestive packet losses under certain conditions (e.g., when variations are most intense). For example, a 5G wireless link may pose a challenge to the performance of TCP congestion control, because the TCP sender may fail to keep its transmission rate tightly coupled with the fair share if the latter is unstable, and separation between the two rates implies throughput shortages (when the transmission rate is smaller) or accumulation of queuing delay (when the transmission rate is larger). For example, a 5G wireless link may pose a challenge to the performance of TCP congestion control, because of access contention jitter due to the shared nature of the wireless medium (e.g., even when bandwidth is plentiful and channel conditions are optimal, the transmission of a packet may be delayed by medium access contention with packets from other sources), since such access contention jitter degrades the accuracy of TCP congestion control schemes that infer congestion from small increases in measured time intervals.

The 5G wireless communication system 100, as noted above, may be configured to support improved TCP congestion control mechanisms. In general, the engineering framework of the 5G system creates clean-slate opportunities for advancing the optimization of TCP congestion control over wireless access links. The MEC (illustratively, MEC 110, as discussed further below) of a 5G system supports virtualization of the link-layer functions of the wireless access link (including virtualization of the network endpoint of the wireless access link). The virtualization of the network endpoint of the wireless access link in the MEC moves the network endpoint of the wireless access link (illustratively, WL 130) from the wireless access device (e.g., from the LTE eNodeB in 4G wireless systems, where the network endpoint was implemented as a physical link endpoint of the wireless access link) to the MEC (where, as noted above, the network endpoint is implemented as a virtualized link endpoint of the wireless access link) and, thus, enables certain innovations which may be used in order to support improved TCP congestion control mechanisms. First, the virtualized link endpoint for WL 130 in the MEC 110 can remain unchanged while the UE 140 moves within the coverage area of the MEC 110 between RHs 130 of the same radio access technology (intra-RAT mobility) or while the UE 140 moves between wireless access devices of different radio access technologies (inter-RAT mobility). This virtualized link endpoint can serve as the anchor point for inter-RAT and intra-RAT mobility events within the coverage area of MEC 110, which is particularly beneficial in 5G systems where the larger capacity of the new access links is expected to come at the cost of reduced coverage and increased handover frequency. Second, the virtualized link endpoint for WL 130 in the MEC 110 may be configured to expose various types of information about the state of the WL 130, such that a TCP sender that resides in the MEC 110 together with the virtualized link endpoint can access and utilize the information from the virtualized link endpoint to provide improved TCP congestion control. In this manner, the 5G wireless communication system 100 may be configured to support improved TCP congestion control by providing a native instance of TCP congestion control configured to guarantee a tight coupling of source rate and link fair share.

The 5G wireless communication system 100 may be configured to support improved TCP congestion control mechanisms configured to resolve the dichotomy between high link utilization and low queuing delay. The dichotomy between high link utilization and low queuing delay may be further understood as follows. Access networks commonly separate traffic into per-service classes with strict-priority scheduling. Typically, managed services (e.g., operator telephony, multicast video, and the like) are mapped to higher-priority classes, while over-the-top (OTT) services share the lower-priority best-effort (BE) class. OTT services typically involve a variety of applications with diverse requirements on network performance. Some of these applications run over TCP transport, but others may use the User Datagram Protocol (UDP) or other end-to-end transmission protocols. While not directly responsible for OTT services, the access network operator has an interest in receiving the best quality-of-experience (QoE) grades for their support. The access network is expected to offer equal treatment to all traffic flows in the BE class, because the flows do not carry explicit identification of the respective applications. The access network also should protect flows that respond adequately to congestion signals from those that maliciously ignore them. In general, throughput fairness is enforced within the BE class, because the QoE of most BE applications improves with higher throughput. Additionally, interactive applications typically require that minimum first-packet latency be guaranteed. It is noted that an access link typically cannot meet both requirements when congested by flows from a variety of traffic sources (some possibly even insensitive to congestion signals) if it stores all BE packets in the same queue; rather, a flow queuing arrangement may be used to simultaneously guarantee throughput fairness, low first-packet latency, and protection from unresponsive flows.

However, while flow queuing provides such guarantees, flow queuing per se does not avoid self-inflicted queuing delay which is detrimental to various types of TII applications (e.g., ARA/R video). Flow-Queuing Active Queue Management (FQ-AQM) schemes, which combine a flow-queuing arrangement with an AQM algorithm for early detection of congestion, are configured to prevent flows from accumulating large numbers of packets (and self-inflicted delays) in their dedicated queues, to lower the first-packet latency of a newly active flow compared to Shared-Queue Active Queue Management (SQ-AQM) schemes, and the queuing delay of a long-lived flow compared to Flow-Queuing Tail Drop (FQ-TD) schemes; however, the FQ-AQM congestion control loop fails to lock onto a stable state under the type of link bandwidth variation that is typical of wireless links. FQ-AQM, which is specifically designed to contain self-inflicted delay, works to keep the queuing delay of all packets below a pre-set delay threshold irrespective of the types of congestion window size (CWND) control that run in the TCP senders, irrespective of the round trip times (RTTs) of the flows, and irrespective of the applications of the flows. However, the queuing delay that is ideal for a TII application whose traffic originates from a nearby server (small RTT) may be too tight (and clearly unnecessary) for an application with larger RTT and looser interactivity. As a result, in setting the FQ-AQM parameters that will apply to all flows, the network operator faces the dilemma between lower link utilization for lower self-inflicted delay and higher delay for higher link utilization.

The 5G wireless communication system 100 may be configured to support improved TCP congestion control mechanisms, which, as noted above, may be configured to resolve the dichotomy between high link utilization and low queuing delay.

The 5G wireless communication system 100 supports a TCP connection 150 between a TCP sender 151 within MEC 110 and a TCP receiver 159 within UE 140. The TCP sender 151, as discussed further below, serves either (1) an application server (which is omitted from FIG. 1 for purposes of clarity, but an example of which is presented with respect to FIG. 2) within MEC 110 or (2) a split-TCP proxy (which is omitted from FIG. 1 for purposes of clarity, but an example of which is presented with respect to FIG. 3) within the MEC 110 that splits an end-to-end TCP connection between a remote application server outside of the MEC 110 and the UE 140. The TCP connection 150 traverses a virtualized link endpoint (VLE) 152 within MEC 110, the RH 120, and the WL 130. The VLE 152 is provided in front of WL 130 in the DL direction. The VLE 152 supports a link buffer 153 associated with the UE 140. The link buffer 153 may be a per-UE/per-service-class link buffer which may support multiple flow queues for multiple TCP flows of the UE 140, respectively. The link buffer 153 may be arbitrarily large. The link buffer 153 supports a flow queue 154 associated with the TCP connection 150 of the UE 140. The flow queue 154 may be part of an FQ-TD arrangement. The 5G wireless communication system 100 also supports an off-band signaling channel 160 for the TCP connection 150, where the off-band signaling channel 160 is established between the VLE 152 and TCP sender 151. The off-band signaling channel 160 may be a User Datagram Protocol (UDP) connection or other suitable type of off-band signaling channel which may be established between the VLE 152 and TCP sender 151.

The improved TCP congestion control mechanisms, which as noted above may be configured to resolve the dichotomy between high link utilization and low queuing delay, may be based on the placement of the TCP sender 151 and the flow queue 154 for the TCP connection 150 for which the improved TCP congestion control is to be provided, as well as on the use of the off-band signaling channel 160 between the flow queue 154 and the TCP sender 151. First, as depicted in FIG. 1, the TCP sender 151 and the flow queue 154 for the TCP connection 150 are placed within the MEC 110, such that these elements run in relatively close proximity to each other. The close proximity of the VLE 152 and the TCP sender 151 reduces the latency of the off-band signaling channel 160 for the TCP connection 150. Second, as depicted in FIG. 1, the flow queue 154 is placed in the VLE 152 in front of the WL 130, thereby excluding the WL 130, and its associated sources of variability, from the path of the control loop provided by the off-band signaling channel 160 for the TCP connection 150. As a result, the off-band signaling channel 160 for the TCP connection 150 may be considered to have negligible latency and high bandwidth, thereby enabling tight control over the self-inflicted queuing delay of the TCP connection 150.

The improved TCP congestion control mechanisms, which as noted above may be configured to resolve the dichotomy between high link utilization and low queuing delay, may be based on configuration of the TCP sender 151 to control transmissions of the TCP connection 150. The TCP sender 151 may be configured to control transmissions of the TCP connection 150 in a way that limits the self-inflicted queuing delay without relying on packet-drop or explicit congestion notification (ECN) decisions made by the link buffer 153 associated with WL 130. The TCP sender 151 may be configured to control transmissions of the TCP connection 150 using a delay-based TCP scheme, because the FQ-TD arrangement rids delay-based TCP of two primary sources of performance degradation, namely the weakness against loss-based TCP in shared bottlenecks and the throughput unfairness when a delay-based sender overestimates the minimum RTT of its data path. It is noted that, where TCP sender 151 may be configured to control transmissions of the TCP connection 150 using a delay-based TCP scheme but without using the off-band signaling channel 160, the accuracy of the congestion control loop would still be sensitive to the RTT of the TCP connection 150 and to the RTT oscillations of WL 130 (RTT oscillations are common in wireless links because of bandwidth variations and UL access contention). It is noted that use of the off-band signaling channel 160 reduces the delay of the control loop (e.g., to the delay of the UL path from the VLE 152 to the TCP sender 151) and removes the RTT oscillations of the control loop, thereby improving operation of the TCP sender 151 in controlling transmissions of the TCP connection 150.

The improved TCP congestion control mechanisms, which as noted above may be configured to resolve the dichotomy between high link utilization and low queuing delay, may be based on configuration of the TCP sender 151 to control transmissions of the TCP connection 150 based on flow control feedback information associated with TCP connection 150 that is determined by the VLE 152 and provided from the VLE 152 to the TCP sender 151.

The VLE 152 is configured to determine flow control feedback information for the TCP connection 150 and to provide the flow control feedback information to the TCP sender 151 for use in controlling packet transmissions of the TCP flow of the TCP connection 150.

The VLE 152 determines the flow control feedback information for TCP connection 150 based on the flow queue 154 associated with TCP connection 150. The flow control feedback information includes information indicative of a saturation state of the flow queue 154 of the TCP connection 150. The VLE 152 may determine the saturation state of the flow queue 154 of the TCP connection 150 directly based on monitoring of the flow queue 154 of the TCP connection 150. The VLE 152 may determine the saturation state of the flow queue 154 of the TCP connection 150 based on queue occupancy statistics or delay statistics. In the case of queue occupancy statistics, the VLE 152 may determine that the flow queue 154 of the TCP connection 150 is saturated based on a determination that the number of packets in the flow queue 154, whether instantaneous or averaged, satisfies a threshold. In the case of queue occupancy statistics, the VLE 152 may infer that the flow queue 154 of the TCP connection 150 is saturated based on a determination that the time that packets spend waiting in the flow queue 154 satisfies a threshold. The VLE 152 may be configured to determine the saturation state of the flow queue 154 of the TCP connection 150 in other ways.

The VLE 152 provides the flow control feedback information for TCP connection 150 to TCP sender 151 for use by TCP sender 151 in controlling packet transmissions of the TCP flow of the TCP connection 150. The VLE 152 provides the flow control feedback information for TCP connection 150 to TCP sender 151 via the off-band signaling channel 160 associated with the TCP connection 150. The flow control feedback information may include a set of one or more bits set in a manner for indicating the saturation state of the flow queue 154 of the TCP connection 150. The flow control feedback information may include a single bit set in a manner for indicating whether or not the flow queue 154 of the TCP connection 150 is saturated (e.g., a value of "0" indicates that the flow queue 154 is unsaturated and a value of "1" indicates that the flow queue 154 is saturated, or vice versa). The VLE 152 may provide the flow control feedback information for TCP connection 150 to TCP sender 151 via the off-band signaling channel 160 using one or more messages. The VLE 152 may be configured to signal an indication of the saturation state of the flow queue 154 of the TCP connection 150 in other ways.

The TCP sender 151 is configured to receive the flow control feedback information for the TCP connection 150 from the VLE 152 and to control packet transmissions of the TCP flow of the TCP connection 150 based on the flow control feedback information. The TCP sender 151 receives the flow control feedback information from the VLE 152 via the off-band signaling channel 160 associated with the TCP connection 150. It is noted that various potential formats for the flow control feedback information are described above (e.g., using a set of bits, using a single bit, or the like). The TCP sender 151 is configured to control packet transmissions of the TCP connection 150 based on the flow control feedback information associated with TCP connection 150. The TCP sender 151 may control transmissions of the TCP connection 150 based on the flow control feedback information associated with TCP connection 150 by dynamically activating and deactivating (starting and stopping) transmission of packets of the TCP connection 150 based on the flow control feedback information associated with TCP connection 150. The TCP sender 151 may control transmissions of the TCP connection 150, where the flow control feedback information associated with TCP connection 150 includes information indicative of the saturation state of the flow queue 154 of the TCP connection 150, by transmitting (or activating transmission of) packets of the TCP flow of the TCP connection 150 based on a determination that the information indicative of the saturation state of the flow queue 154 indicates that the flow queue 154 is unsaturated and preventing (or deactivating) transmission of packets of the TCP flow of the TCP connection 150 based on a determination that the information indicative of the saturation state of the flow queue 154 indicates that the flow queue 154 is saturated. For example, where a single bit is used to indicate the saturation state of the flow queue 154, with a value of "0" indicating unsaturated and a value of "1" indicating saturated, the TCP sender 151 continues transmission of packets of the TCP flow of the TCP connection 150 as long as the value of the saturation state of the flow queue 154 remains set to "0" and prevents transmission of packets of the TCP flow of the TCP connection 150 as long as the value of the saturation state of the flow queue 154 remains set to "1" (with transmissions being stopped on transitions of the value from "0" to "1" and with transmissions being resumed on transitions of the value from "1" to "0").

It is noted that use of information indicative of the saturation state of the flow queue 154 of the TCP connection 150 for controlling transmissions of the TCP connection 150 may obviate the need for the TCP sender 151 to set a value of CWND for the TCP connection 150 (by combining an estimate of the bandwidth of the WL 130 with its measurement of the minimum RTT), that fully utilizes the estimated bandwidth while bounding queuing delay, which may be useful since such an approach does not compensate for recent errors in the estimation of the available bandwidth and their effect on the accumulation of queuing delay.

The 5G wireless communication system 100, as noted above, may be configured to support improved TCP congestion control mechanisms to provide congestion control for various types of applications. The applications that utilize improved TCP congestion control mechanisms may run on application servers that reside at various locations (e.g., within the MEC 110 or outside of the MEC 110) and the manner in which applications utilize improved TCP congestion control mechanisms may depend on the locations where the application servers reside.

In at least some embodiments, an application that utilizes improved TCP congestion control may run on a server that resides within the MEC 110. Here, the co-location of the native TCP sender and the virtualized link endpoint for WL 130 within the MEC 110 may be exploited for optimized delivery of data as well as for supporting improved TCP congestion control associated with delivery of data. An embodiment is presented with respect to FIG. 2.

In at least some embodiments, an application that utilizes improved TCP congestion control may run on a server that resides outside of the MEC 110. This may be the case, for example, where the application server cannot be embedded within the MEC 110 (e.g., the application runs OTT without a hosting agreement with the 5G provider, the application endpoint is not geographically constrained (e.g., a drone), the application endpoint is a live video source in a remote location, or the like). In at least some such embodiments, a split-TCP proxy may be deployed within the MEC 110 for splitting the TCP connection between the application server and the receiver into a first TCP connection segment (also referred to herein as a north segment) between the application server and the split-TCP proxy and a second segment (also referred to herein as a south segment) between the split-TCP proxy and the receiver. The split-TCP proxy may include a north-facing receiver configured to optimize the data stream between the application server and the split-TCP proxy and a south-facing native TCP sender configured to optimize the data stream between the split-TCP proxy and the receiver. An embodiment is presented with respect to FIG. 3. It is noted that, in general, deployment of application servers and split-TCP proxies in the MEC, with or without inclusion of a native TCP sender, involves consumption of processing power and, therefore, also involves a cost for the 5G wireless provider. It is expected that not every application requires optimizations and that not every subscriber may be willing to pay a premium for a better QoE and, therefore, that it may be desirable to support selective use of improved TCP congestion control (rather than using improved TCP congestion control for all applications and subscribers). In at least some embodiments, network slicing capabilities of 5G systems may be used, for data path differentiation, in order to selectively apply improved TCP congestion control within the 5G wireless communication system 100.

Figure 2:
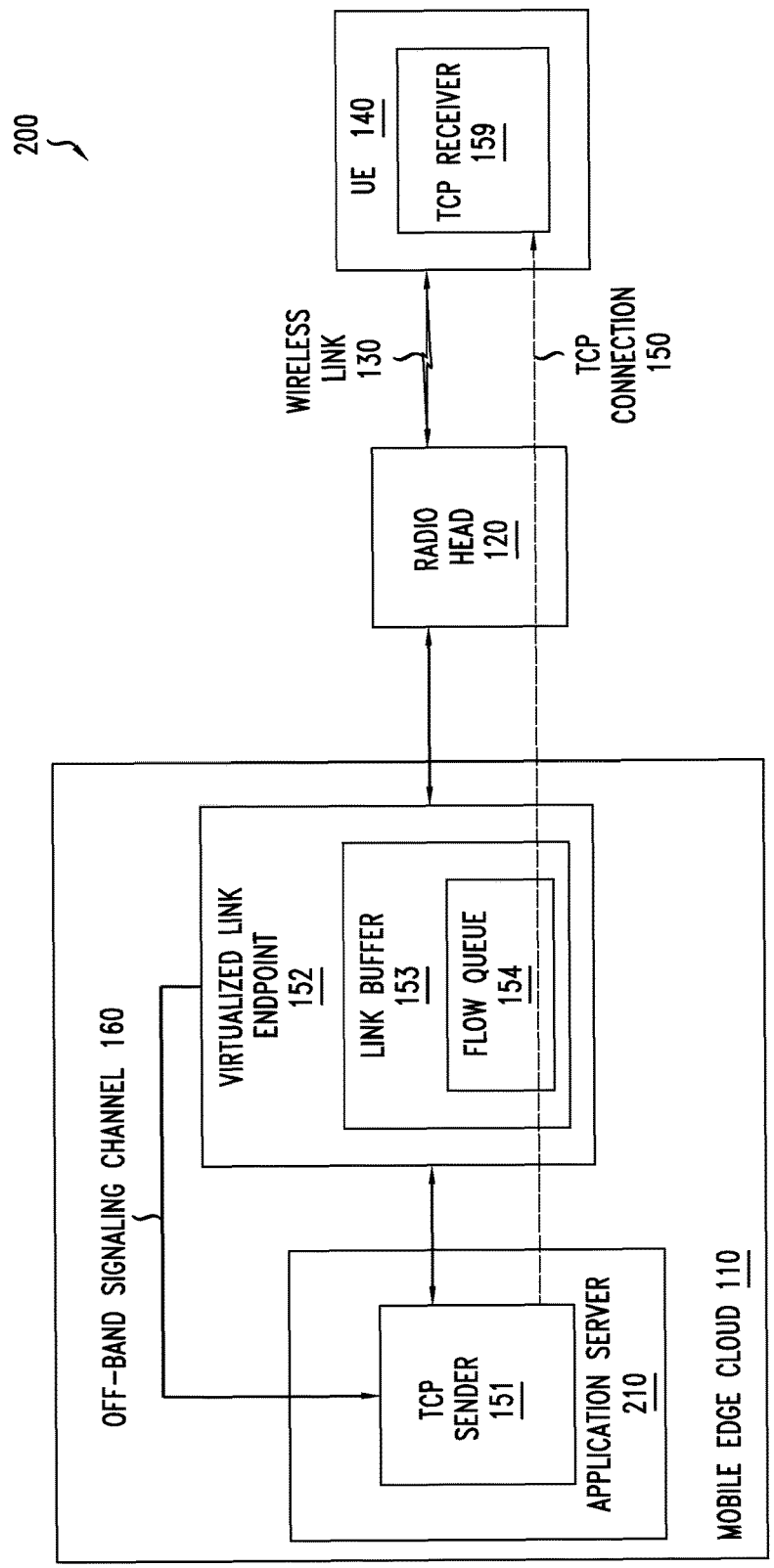
FIG. 2 depicts an example of the 5G wireless communication system of FIG. 1 in which the TCP sender is associated with an application endpoint that is located within a mobile edge cloud of the 5G wireless communication system.

FIG. 2 depicts an example of the 5G wireless communication system of FIG. 1 in which the TCP sender is associated with an application endpoint that is located within a MEC of the 5G wireless communication system. This arrangement may be used where it is possible to deploy the application server within MEC 110. As depicted in FIG. 2, the 5G wireless communication system 200 of FIG. 2 is substantially similar to the 5G wireless communication network 100 of FIG. 1. The TCP sender 151 is implemented within an application server 210 which is located within the MEC 110.

Figure 3:
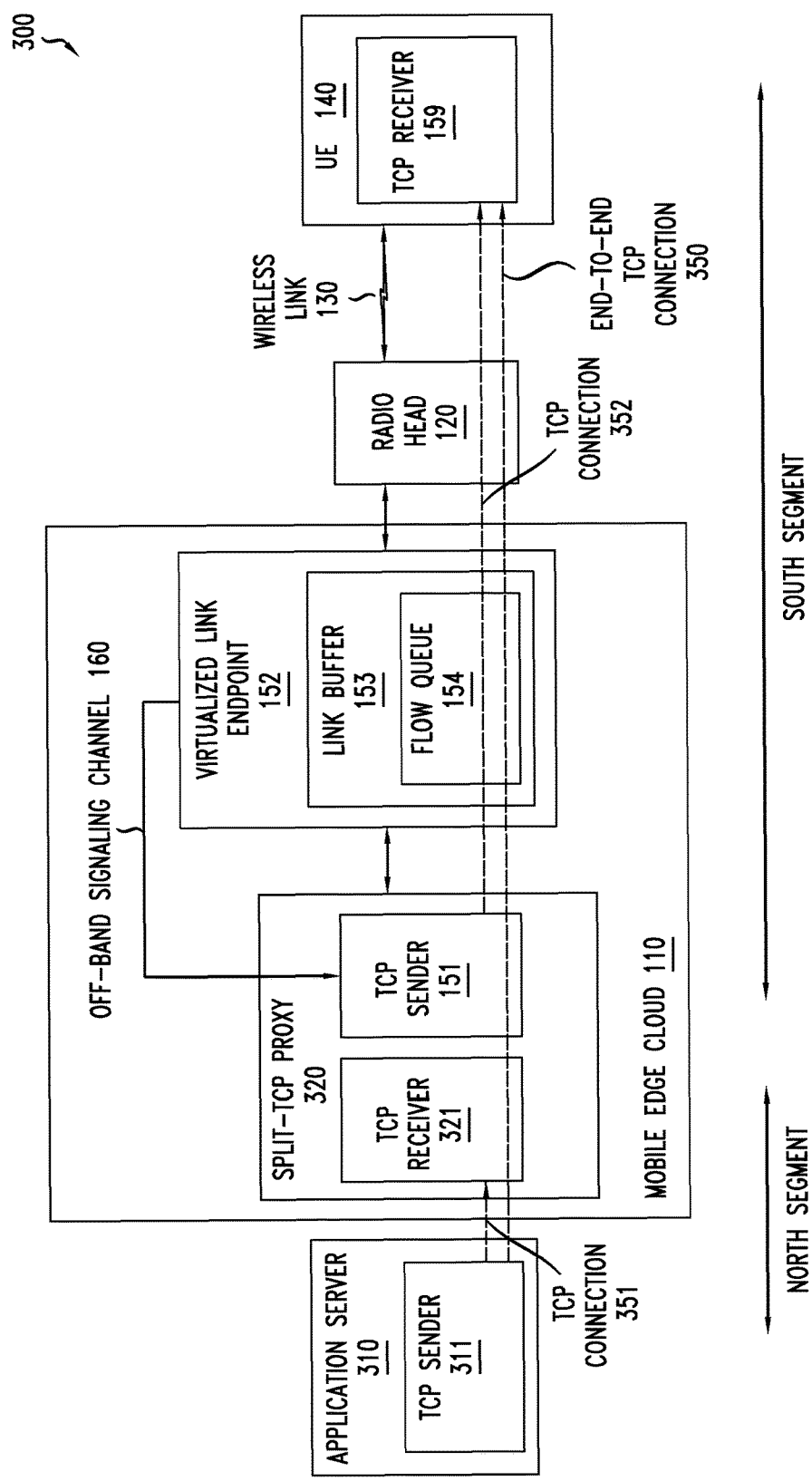
FIG. 3 depicts an example of the 5G wireless communication system of FIG. 1 in which the TCP sender is associated with a split-TCP proxy provided within a mobile edge cloud of the 5G wireless communication system for supporting a remote application endpoint.

FIG. 3 depicts an example of the 5G wireless communication system of FIG. 1 in which the TCP sender is associated with a split-TCP proxy provided within a MEC of the 5G wireless communication system for supporting a remote application endpoint. This arrangement may be used in situations in which it is necessary or desirable for the application server to be located outside of the MEC 110 (e.g., the application runs OTT without a hosting agreement with the 5G wireless provider, the application endpoint is not geographically constrained, the application endpoint is a live video source in a remote location, or the like). As depicted in FIG. 3, the 5G wireless communication system 300 of FIG. 3 is similar to the 5G wireless communication network 100 of FIG. 1 in some respects; however, an application server 310 is located outside of the MEC 110 and a split-TCP proxy 320 located within the MEC 110 splits an end-to-end TCP connection 350 between application server 310 and UE 140. The split-TCP proxy 320 splits the end-to-end TCP connection 350 between application server 310 and UE 140 into two segments including (1) a first (or north) segment which includes a TCP connection 351 from a TCP sender 311 of the application server 310 to a TCP receiver 321 of the split-TCP proxy 320 and (2) a second (or south) segment which includes a TCP connection 352 from the TCP sender 151 of the split-TCP proxy 320 to the TCP receiver 159 of UE 140. The split-TCP proxy 320 is configured to splice the TCP connection 351 of the north segment and the TCP connection 352 of the south segment to support the end-to-end TCP connection 350. The split-TCP proxy 320 may be configured to operate within an access slice of the 5G wireless communication system 300 (e.g., within an access slice for TII applications). The TCP sender 151 is implemented within the split-TCP proxy 320 for providing improved TCP congestion control for the TCP connection 352 of the south segment of the end-to-end TCP connection 350 (e.g., TCP congestion control for the TCP connection 352 is similar to the TCP congestion control for TCP connection 150 of FIG. 1). However, the improved TCP congestion control for the TCP connection 352 of the south segment of the end-to-end TCP connection 350 may not be sufficient to guarantee the interactivity of the application, in which case the TCP connection 351 of the north segment of the end-to-end TCP connection 350 may be optimized for minimum queuing delay (otherwise the split-TCP proxy 320 would only be able to achieve the transfer of the queuing delay from the TCP sender 151 of the south segment to the receiver of the north segment without meaningful reduction of the overall end-to-end delay for end-to-end TCP connection 350 between application server 310 and UE 140). It is noted that the network path of the north segment may conceivably include multiple links and that the RTT of the network path of the north segment may be tens of milliseconds just for propagation. As a result, the improved TCP congestion control provided for the TCP connection 352 of the south segment of the end-to-end TCP connection 350 may not work for the north segment. Additionally, it is noted that, in the north segment, there is no shorter data path available for an off-band signaling connection. However, in the split-TCP proxy 320, the TCP receiver 321 of the north segment of the end-to-end TCP connection 350 has immediate visibility of the waiting time of packets in the buffers of the TCP receiver 321 of the north segment of the end-to-end TCP connection 350 as well as the TCP sender 151 of the south segment of the end-to-end TCP connection 350 and may be configured to use such information in order to compute a CWND value for the TCP sender 311 of the north segment of the end-to-end TCP connection 350 that keeps that waiting time negligible (e.g., the CWND calculation may derive directly from delay-based TCP). The TCP receiver 321 of the north segment of the end-to-end TCP connection 350 may signal the target CWND value to the TCP sender 311 of the north segment of the end-to-end TCP connection 350 using the advertised window (AWND) field of the TCP ACK header or using other suitable signaling mechanisms.

Figure 4:
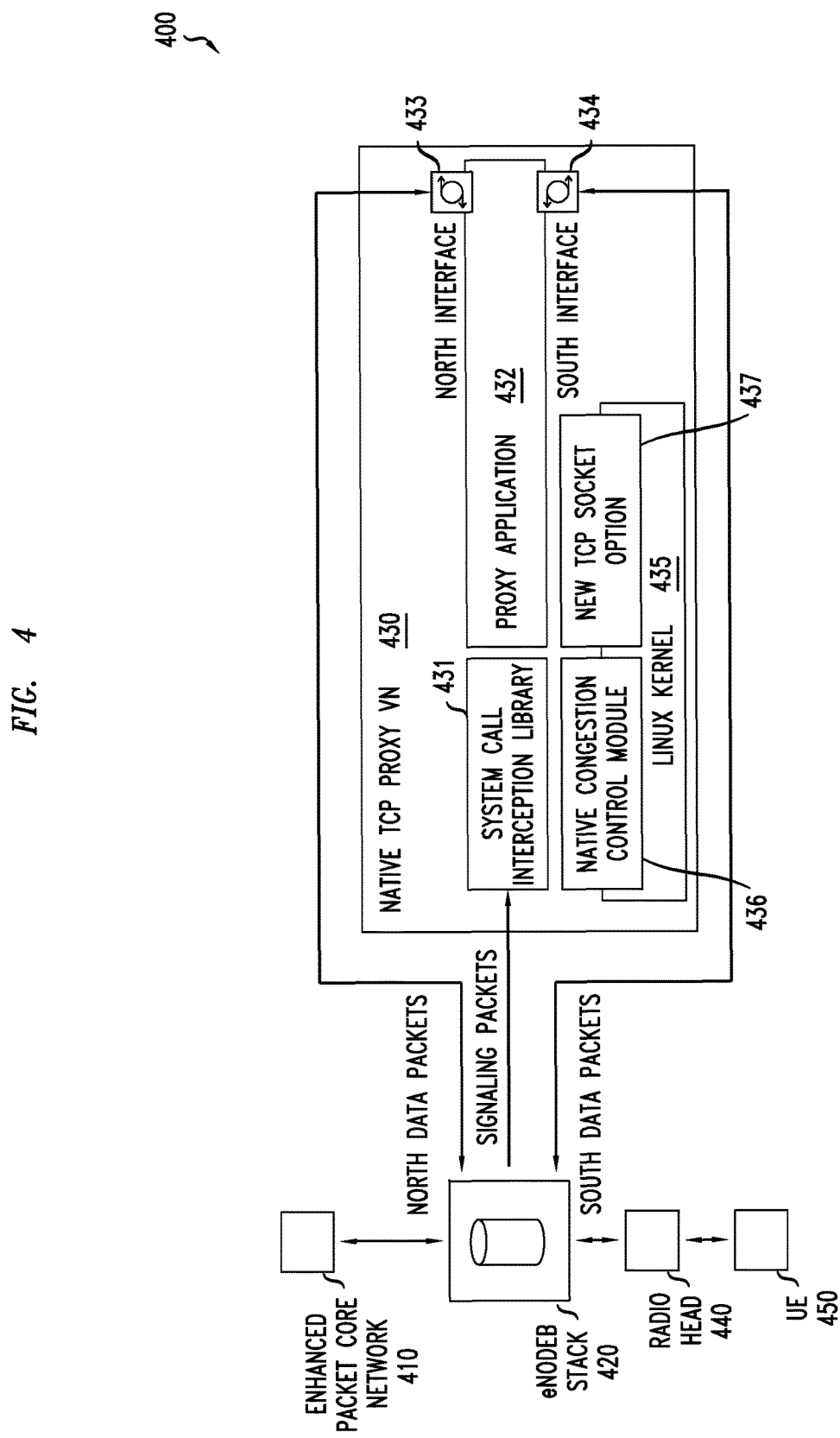
FIG. 4 depicts an example of the 5G wireless communication system of FIG. 3 in which the TCP sender is associated with a split-TCP proxy that is implemented within the context of a representative implementation of an LTE eNodeB stack.

FIG. 4 depicts an example of the 5G wireless communication system of FIG. 3 in which the TCP sender is associated with a split-TCP proxy that is implemented within the context of a representative implementation of an LTE eNodeB stack.

The 5G wireless communication system 400 includes an enhanced packet core (EPC) network 410, an eNodeB stack 420, a native TCP proxy virtual machine (VM) 430 configured to provide split-TCP proxy functions, a radio head (RH) 440, and a user equipment (UE) 450.

The eNodeB stack 420 includes an FQ-TD module 421. The eNodeB stack 420 may be configured such that the FQ-TD module 421 is added to the Packet Data Convergence Protocol (PDCP) sublayer of the eNodeB stack 420. The FQ-TD module 421 is configured to provide separate queuing for TCP flows of the same LTE bearer of UE 450 using separate flow queues (e.g., similar to flow queue 154 of FIG. 3). The flow queues in the FQ-TD module 421 use UDP packets to signal their occupancy updates to the respective south senders in the network stack of the native TCP proxy VM 430.

The native TCP proxy VM 430 is configured to support a number of functions, including interception of packets from the eNodeB (both UL and DL), transparent acceptance of TCP connection requests from the UE 440, spoofing of the client source address and opening of the north segment of the split connection to the remote server via EPC network 410, and delivery of the flow control signals to the south senders in the network stack of the native TCP proxy VM 430.

The native TCP proxy VM 430 includes a System Call Interception Library (SCIL) 431, a Proxy Application (PA) 432 supporting a North Interface (NI) 433 for use in exchanging data packets with EPC network 410 and a South Interface (SI) 434 for use in exchanging data packets with RH 440, and a Linux Kernel (LK) 435 supporting a Native Congestion Control Module (NCCM) 436 and a New TCP Socket Option 437.

The eNodeB stack 420 and the native TCP proxy VM 430 are configured to support communication of TCP packets in the UL and DL directions. In general, packets are extracted from the eNodeB stack 420 below the S1-U interface. In the UL direction, a PDCP service data unit (SDU) is wrapped with a UDP header for transmission to native TCP proxy VM 430 using the Foo-over-UDP protocol available in the LK 435. The native TCP proxy VM 430 removes the UDP header and delivers the SDU to the network stack of native TCP proxy VM 430. In the DL direction, a DL packet from the network stack of native TCP proxy VM 430 follows the reverse path to the eNodeB stack 420, where it receives the PDCP header and proceeds on its course to the UE 450. An iptables rule in the native TCP proxy VM 430 invokes the REDIRECT action of a Network Address Translation (NAT) table to forward incoming UL TCP packets to a port on the local physical machine. This action replaces the source address and port of the original UL TCP packets with the IP address of the local host and the port number of the proxy while keeping a copy of the destination address and port in the New TCP Socket Option 437. The PA 432 accepts the TCP connection request from the UE 450, extracts the original destination information, and starts a new connection to the destination through the NI 433. The SOURCE NAT (SNAT) action triggered by iptables spoofs the address of the UE 450 in the packets that leave the NI 433.

The eNodeB stack 420 and the native TCP proxy VM 430 are configured to support signaling messages related to supporting congestion control for transfer of TCP packets. The New TCP Socket Option 437 of LK 435 is configured to hold information from the eNodeB stack 420. The SCIL 431 is configured to link dynamically to the PA 432 for receiving the eNodeB signals over a UDP socket. The SCIL 431 is also configured to intercept the accept( ), connect( ), and close( ) system calls from the PA 432 in order to keep track of all of the TCP connections to the UE that are currently active. Upon receiving a message from the eNodeB stack 420, the SCIL 431 passes the information to the relevant TCP socket by writing it to the New TCP Socket Option 437. The NCCM 436 is configured to set the state of the TCP sender based on the flow-control value found in the New TCP Socket Option 437. The NCCM 436 is configured to operate such that the throughput of the DL data flow stays locked onto the available bandwidth and the queuing delay is negligible. Packet losses over the wireless link between RH 440 and UE 450 have no practical effects on either of these metrics.

As discussed herein, various embodiments of the congestion control capability may be configured to leverage network slicing supported in 5G wireless communication systems in order to selectively control application of congestion control based on flow control, thereby making application of the congestion control capability more scalable. The computing resources allocated to hosted application servers and split-TCP proxies within the MEC data center (which, as illustrated in FIG. 2 and FIG. 3, may utilize TCP senders configured to support improved congestion control based on flow control feedback information) are shared with other functions within the MEC data center and the availability of such computing resources may fluctuate over time, such that the 5G wireless provider has an incentive to avoid universal activation of TCP senders that are configured to support improved congestion control based on flow control feedback information. Applications that are not interactive or not throughput-intensive typically do not have a need to tightly limit the self-inflicted delay, so an FQ-TD arrangement of the link buffer is sufficient to maximize their QoE. If the access provider charges a premium for native support of TII applications, mobile broadband users that are not interested in them may simply opt out and only subscribe to a lower-tier service. The FQ-TD arrangement can be treated as an optional feature for further service differentiation in the lower tiers. Table I shows an example of service tiers that can be offered to end users based on the chaining of the FQ-TD and native TCP proxy functions.

TABLE 1

Native Functions in Slice

| Service Tier | FQ-TD | TCP Proxy | Empowered Applications |
|---|---|---|---|
| Bronze | No | No | applications with servers hosted in MEC |
| Silver | Yes | No | high-throughput: on-demand video, web, bulk data, others low-latency low-throughput: OTT voice, gaming, others |
| Gold | Yes | Yes | TII: AR/VR, remotely controlled vehicles, robots, tools, others |

It will be appreciated that, although primarily presented herein with respect to embodiments in which improved congestion control is provided in the DL direction (namely, where the TCP sender that is providing improved congestion control is located within the network), improved congestion control also or alternatively may be provided in the UL direction (in which case the TCP sender that is providing improved congestion control is located within the wireless end device). An example of a 5G wireless communication system in which the TCP sender is implemented within a UE is presented with respect to FIG. 5.

Figure 5:
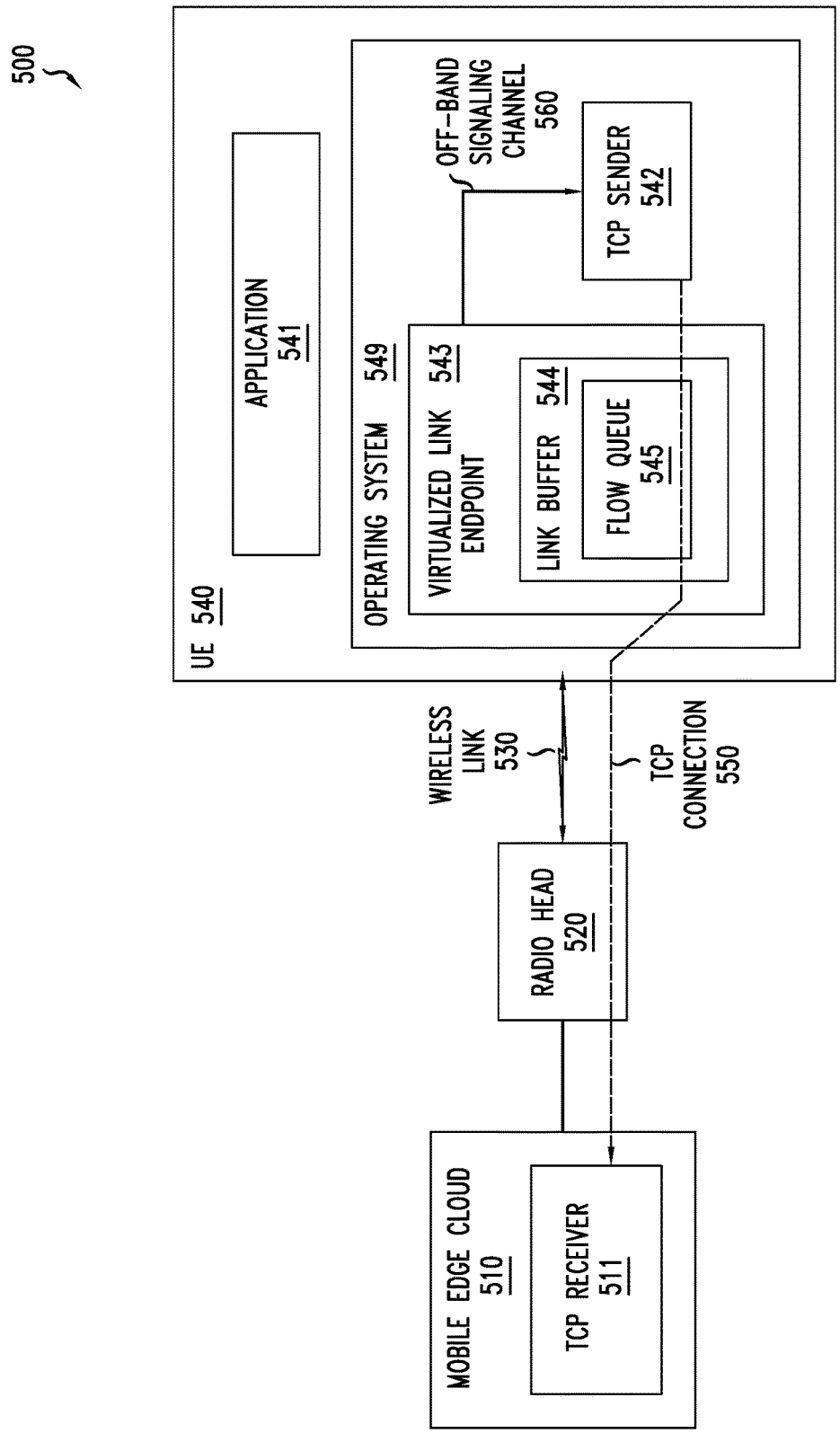
FIG. 5 depicts an example of a 5G wireless communication system in which the TCP sender is implemented within a UE.

FIG. 5 depicts an example of a 5G wireless communication system in which the TCP sender is implemented within a UE.

The 5G wireless communication system includes a mobile edge cloud (MEC) 510, a radio head (RH) 520, a wireless link (WL) 530, and a user equipment (UE) 540.

The UE 540 includes an application 541, a TCP sender 542, and a virtualized link endpoint (VLE) 543. The VLE 543 includes a link buffer 544 that supports a flow queue 545. The TCP sender 542 and the VLE 543 (and, similarly, the link buffer 544 and the flow queue 545 of the VLE 543) may be implemented within the UE 540 in various ways. In at least some embodiments, as depicted in FIG. 5, the TCP sender 542 and VLE 543 may be implemented within an operating system (OS) 549 of the UE 540. The TCP sender 542 may be implemented within the OS 549 in various ways (e.g., using one or both of the kernel of the OS 549 or the user-space of the OS 549). The VLE 543 (and, similarly, the link buffer 544 and the flow queue 545 of the VLE 543) may be implemented within the OS 549 in various ways (e.g., using one or both of the kernel of the OS 549 or the user-space of the OS 549). It is noted that other implementations of the TCP sender 542 and the VLE 543 within UE 540 are contemplated.

The MEC 510 includes a TCP receiver 511 (although it will be appreciated that the TCP receiver 511 may be located outside of the MEC 510 and that the MEC 510 may simply support communications between the TCP sender 542 and the TCP receiver 511 that is located outside of MEC 510).

The TCP sender 542 and the TCP receiver 511 have a TCP connection 550 established therebetween. The TCP connection 550 traverses the VLE 543 (including the link buffer 544 and, more specifically, flow queue 545) as well as WL 530.

The VLE 543 and the TCP sender 542 have an off-band signaling channel 560 established therebetween. The TCP sender 542 and VLE 543, as depicted in FIG. 5, may be implemented within the OS 549 of the UE 540 such that a network connection does not need to be opened for the off-band signaling channel 560.

The VLE 543 and the TCP sender 542 are configured to cooperate to provide congestion control for the TCP connection 550 using the off-band signaling channel 560. The VLE 543 is configured to determine a saturation state of the flow queue 545 of the TCP connection 550 and to provide an indication of the saturation state of the flow queue 545 of the TCP connection 550 to the TCP sender 542, via the off-band signaling channel 560, for use by the TCP sender 542 in controlling transmissions of the TCP flow of the TCP connection 550. The TCP sender 542 is configured to receive the indication of the saturation state of the flow queue 545 of the TCP connection 550 from the VLE 543 and to control transmissions of the TCP flow of the TCP connection 550 based on the indication of the saturation state of the flow queue 545 of the TCP connection 550 (e.g., dynamically activating and deactivating transmissions of the TCP flow of the TCP connection 550 based on determinations that the flow queue 545 is unsaturated or saturated, respectively). It will be appreciated that configuration and operation of the TCP sender 542 and the VLE 543 for providing congestion control for the TCP connection 550 in the UL direction (presented with respect to FIG. 5) may be similar to the configuration and operation of the TCP sender 151 and the link buffer 153 for providing congestion control for the TCP connection 150 in the DL direction (presented with respect to FIGS. 1-3).

It will be appreciated that, although primarily presented herein with respect to embodiments of UL congestion control in which the UE (illustratively, UE 540) includes an integrated wireless interface, in at least some embodiments UL congestion control may be provided for UEs that do not include an integrated wireless interface. For example, some UEs (e.g., laptops or other types of end devices) may connect wirelessly through an external device (e.g., a dongle connected through a Universal Serial Bus (USB) port of the UE, or other type of external device). In at least some such embodiments, as long as the wireless link that physically terminates at the external device has its link endpoint virtualized within the host device (i.e., the UE), then the communication between link endpoint and the TCP sender can remain intra-OS such that it does not need to traverse the link that connects the external device to the host.

Figure 6:
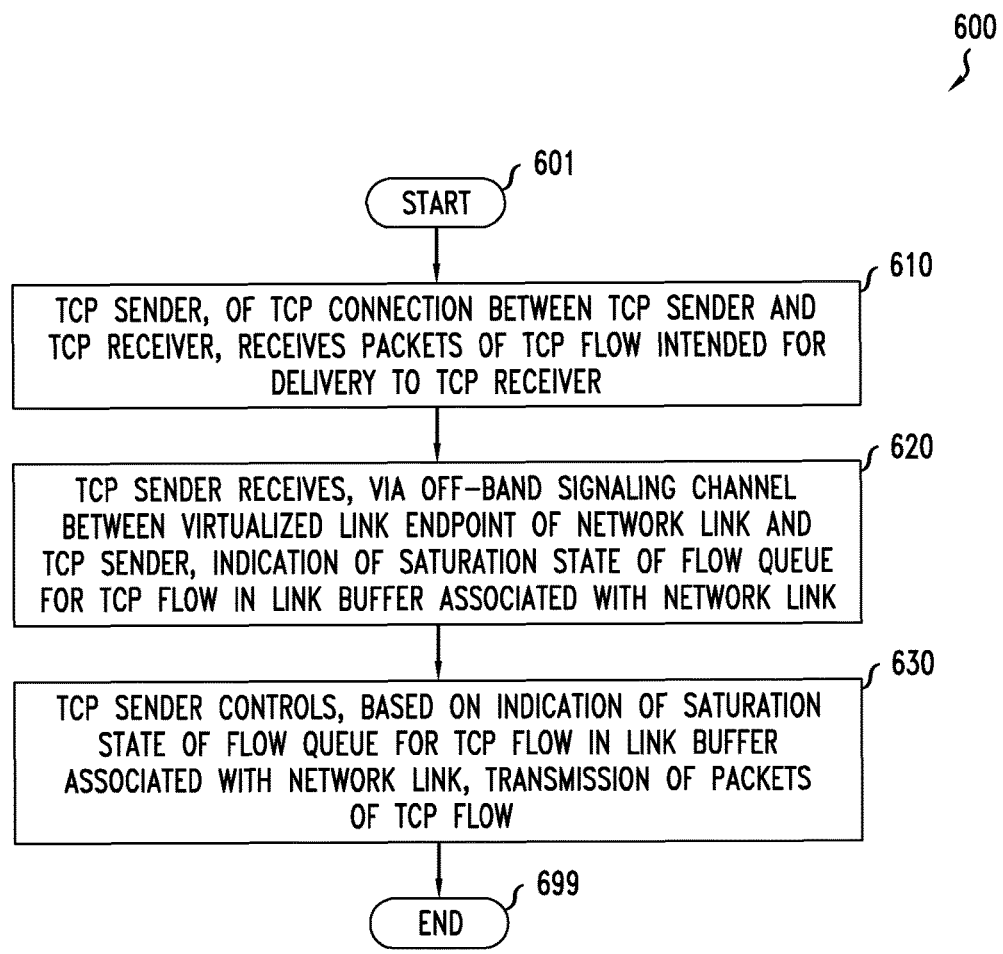
FIG. 6 depicts an embodiment of a method for use by a TCP sender to perform congestion control for a TCP flow of a TCP connection based on flow control feedback information of a flow queue associated with the TCP flow of the TCP connection.

FIG. 6 depicts an embodiment of a method for use by a TCP sender to perform congestion control for a TCP flow of a TCP connection based on flow control feedback information of a flow queue associated with the TCP flow of the TCP connection. It will be appreciated that for DL congestion control the TCP sender and the flow queue may be located on the network side of the wireless link (e.g., as presented with respect to FIGS. 1-4) and that for UL congestion control the TCP sender and the flow queue may be located on the UE side of the wireless link (e.g., as presented with respect to FIG. 5). It will be appreciated that, although primarily presented herein as being performed serially, at least a portion of the blocks of method 600 may be performed contemporaneously or in a different order than as presented in FIG. 6.

At block 601, method 600 begins.

At block 610, the TCP sender, of a TCP connection between the TCP sender and a TCP receiver, receives packets of a TCP flow that are intended for delivery to the TCP receiver.

At block 620, the TCP sender receives, via an off-band signaling channel between a virtualized link endpoint of a network link and the TCP sender, an indication of a saturation state of a flow queue for the TCP flow in a link buffer associated with the network link.

At block 630, the TCP sender controls, based on the indication of the saturation state of the flow queue for the TCP flow in the link buffer associated with the network link, transmission of packets of the TCP flow.

At block 699, method 600 ends.

Figure 7:
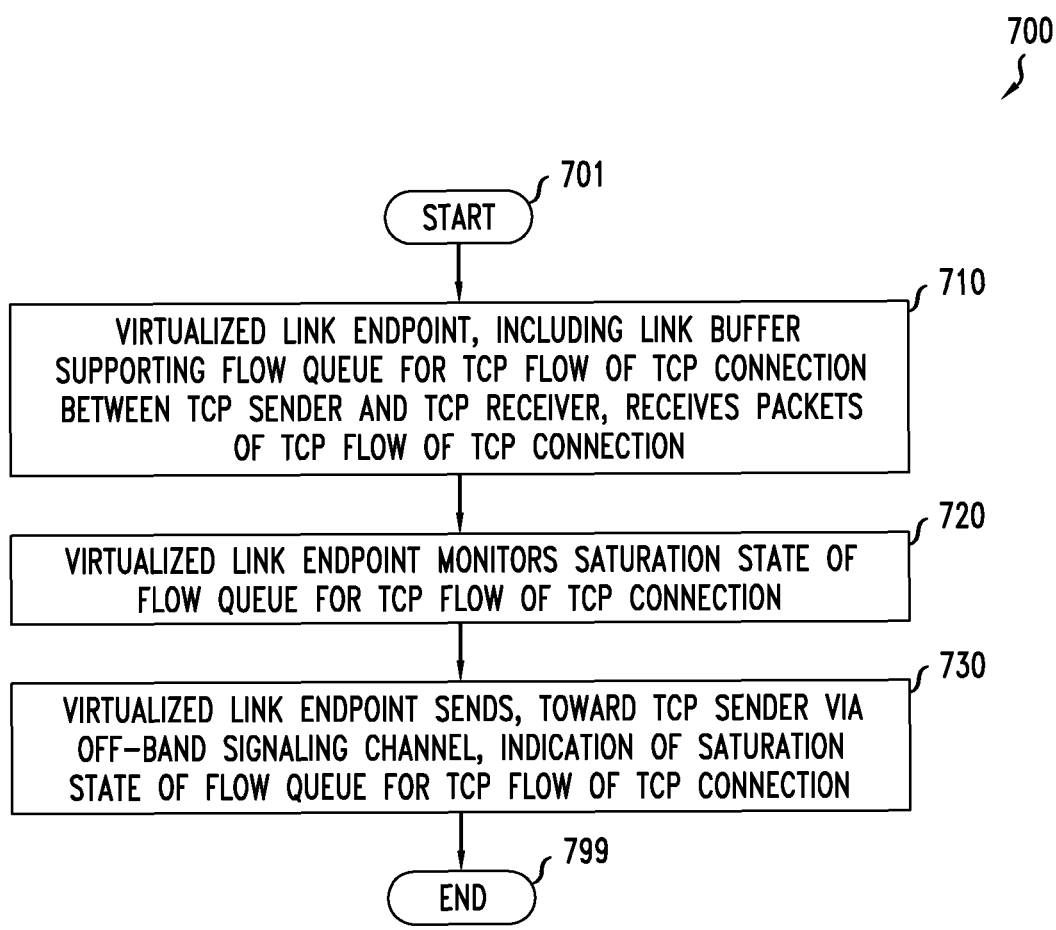
FIG. 7 depicts an embodiment of a method for use by a virtualized link endpoint to provide feedback information of a flow queue associated with a TCP flow of a TCP connection for use by a TCP sender to perform congestion control for the TCP flow of the TCP connection.

FIG. 7 depicts an embodiment of a method for use by a virtualized link endpoint to provide feedback information of a flow queue associated with a TCP flow of a TCP connection for use by a TCP sender to perform congestion control for the TCP flow of the TCP connection. It will be appreciated that for DL congestion control the TCP sender and the flow queue may be located on the network side of the wireless link (e.g., as presented with respect to FIGS. 1-4) and that for UL congestion control the TCP sender and the flow queue may be located on the UE side of the wireless link (e.g., as presented with respect to FIG. 5). It will be appreciated that, although primarily presented herein as being performed serially, at least a portion of the blocks of method 700 may be performed contemporaneously or in a different order than as presented in FIG. 7.

At block 701, method 700 begins.

At block 710, the virtualized link endpoint, which includes a link buffer including a flow queue for a TCP flow of a TCP connection between a TCP sender and a TCP receiver, receives packets of the TCP flow of the TCP connection.

At block 720, the virtualized link endpoint monitors a saturation state of the flow queue for the TCP flow of the TCP connection.

At block 730, the virtualized link endpoint sends, toward the TCP sender via an off-band signaling channel, an indication of the saturation state of the flow queue for the TCP flow of the TCP connection.

At block 799, method 700 ends.

It will be appreciated that, although primarily presented herein within the context of providing congestion control using a virtualized link endpoint for the network link, in at least some embodiments the link endpoint for the network link may not be a virtualized link endpoint.

It will be appreciated that, although primarily presented herein within the context of providing congestion control within the context of a specific type of transmission control protocol and associated congestion control mechanism (namely, TCP and associated TCP congestion control mechanisms), various embodiments of the congestion control capability may be configured to provide congestion control for various other types of transmission control protocols and associated congestion control mechanisms. Accordingly, various references herein to TCP specific terms for TCP embodiments may be read more generally to cover other types of transmission control mechanisms other than TCP (e.g., using "transport flow sender" or "sender" rather than "TCP sender" as used herein, using "transport flow receiver" or "receiver" rather than "TCP receiver" as used herein, using "transport connection" rather than "TCP connection" as used herein, using "transport congestion control" rather than "TCP congestion control" as used herein, and so forth).

It will be appreciated that, although primarily presented herein within the context of providing congestion control in specific types of communication systems (namely, in wireless communication systems and, more specifically, in 5G wireless communication systems), various embodiments of the congestion control capability may be configured to provide congestion control in various other types of communication systems (e.g., other types of wireless communication systems, in wireline communication systems, or the like). Accordingly, various references herein to wireless-specific terms for wireless embodiments may be read more generally to cover wireline-specific terms for wireline embodiments (e.g., using "wireline link" instead of "wireless link") or to cover more general terms which may cover both wireless and wireline embodiments (e.g., using "network link" instead of "wireless link" or "wireline link").

Figure 8:
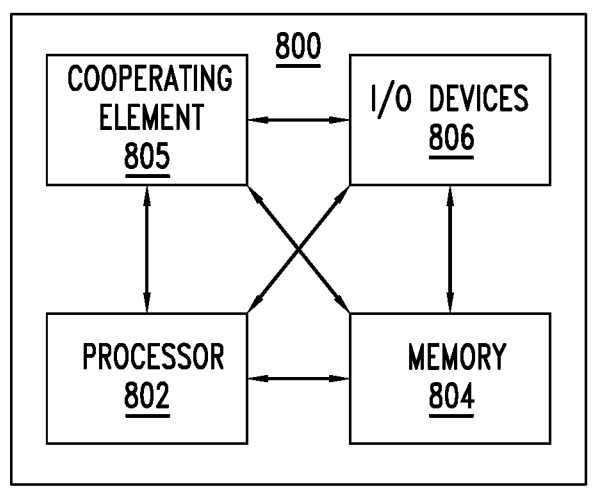
FIG. 8 depicts a high-level block diagram of a computer suitable for use in performing various functions described herein.

FIG. 8 depicts a high-level block diagram of a computer suitable for use in performing various functions presented herein.

The computer 800 includes a processor 802 (e.g., a central processing unit (CPU), a processor having a set of processor cores, a processor core of a processor, or the like) and a memory 804 (e.g., a random access memory (RAM), a read only memory (ROM), or the like). The processor 802 and the memory 804 are communicatively connected.

The computer 800 also may include a cooperating element 805. The cooperating element 805 may be a hardware device. The cooperating element 805 may be a process that can be loaded into the memory 804 and executed by the processor 802 to implement functions as discussed herein (in which case, for example, the cooperating element 805 (including associated data structures) can be stored on a non-transitory computer-readable storage medium, such as a storage device or other storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 of FIG. 8 may represent a general architecture and functionality suitable for implementing functional elements described herein, portions of functional elements described herein, or the like, as well as various combinations thereof. For example, computer 800 may provide a general architecture and functionality that is suitable for implementing all or part of one or more of the elements presented herein.

It will be appreciated that at least some of the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus at least to:
   receive, by a transport flow sender of a transport connection between the transport flow sender and a transport flow receiver, packets of a transport flow that are intended for delivery to the transport flow receiver via a network link of a network access element;
   receive, by the transport flow sender via an off-band signaling channel between a virtualized link endpoint of the network link and the transport flow sender, an indication of a saturation state of a flow queue for the transport flow in a link buffer associated with the virtualized link endpoint of the network link, wherein the virtualized link endpoint of the network link is separated from the network access element; and
   control, by the transport flow sender based on the indication of the saturation state of the flow queue for the transport flow in the link buffer associated with the virtualized link endpoint of the network link, transmission of packets of the transport flow.

2. The apparatus of claim 1, wherein the network link comprises a wireless link.

3. The apparatus of claim 1, wherein the virtualized link endpoint of the network link and the transport flow sender are co-located.

4. The apparatus of claim 1, wherein the virtualized link endpoint of the network link is located within a datacenter.

5. The apparatus of claim 4, wherein the transport flow sender is located within the datacenter.

6. The apparatus of claim 4, wherein the transport flow sender is located upstream of the datacenter.

7. The apparatus of claim 4, wherein the datacenter comprises a mobile edge cloud (MEC).

8. The apparatus of claim 1, wherein the off-band signaling channel comprises a User Datagram Protocol (UDP) connection.

9. The apparatus of claim 1, wherein the transport flow sender and the virtualized link endpoint of the network link are located within a wireless end device.

10. The apparatus of claim 9, wherein the off-band signaling channel is established within an operating system (OS) of the wireless end device.

11. The apparatus of claim 1, wherein the indication of the saturation state of the flow queue for the transport flow conveys an indication of both link bandwidth and queuing delay.

12. The apparatus of claim 1, wherein the indication of the saturation state of the flow queue for the transport flow comprises a set of bits.

13. The apparatus of claim 1, wherein the indication of the saturation state of the flow queue for the transport flow comprises a single bit.

14. The apparatus of claim 13, wherein, to control transmission of packets of the transport flow, the at least one memory and the computer program code are configured to, with the at least one processor, cause the apparatus at least to:
continue transmitting packets of the transport flow based on a determination that the single bit is a first value; or
stop transmitting packets of the transport flow based on a determination that the single bit is a second value.

15. The apparatus of claim 1, wherein, to control transmission of packets of the transport flow, the at least one memory and the computer program code are configured to, with the at least one processor, cause the apparatus at least to:
transmit packets of the transport flow based on a determination that the indication of the saturation state of the flow queue for the transport flow is indicative that the flow queue is unsaturated.

16. The apparatus of claim 1, wherein, to control transmission of packets of the transport flow, the at least one memory and the computer program code are configured to, with the at least one processor, cause the apparatus at least to:
prevent transmission of packets of the transport flow based on a determination that the indication of the saturation state of the flow queue for the transport flow is indicative that the flow queue is saturated.

17. The apparatus of claim 1, wherein the transport flow is associated with a network slice of an underlying communication network, wherein the network slice has associated therewith a flow-based congestion control mechanism, wherein the off-band signaling channel is established based on a determination that the transport flow is associated with the network slice.

18. The apparatus of claim 1, wherein the transport flow sender is a Transmission Control Protocol (TCP) sender, the transport flow receiver is a TCP receiver, the transport connection is a TCP connection, and the transport flow is a TCP flow.

19. A method, comprising:
receiving, by a transport flow sender of a transport connection between the transport flow sender and a transport flow receiver, packets of a transport flow that are intended for delivery to the transport flow receiver via a network link of a network access element;
receiving, by the transport flow sender via an off-band signaling channel between a virtualized link endpoint of the network link and the transport flow sender, an indication of a saturation state of a flow queue for the transport flow in a link buffer associated with the virtualized link endpoint of the network link, wherein the virtualized link endpoint of the network link is separated from the network access element; and
controlling, by the transport flow sender based on the indication of the saturation state of the flow queue for the transport flow in the link buffer associated with the virtualized link endpoint of the network link, transmission of packets of the transport flow.

20. An apparatus, comprising:
at least one processor; and
at least one memory including computer program code;
wherein the at least one memory and the computer program code are configured to, with the at least one processor, cause the apparatus at least to:
receive, by a virtualized link endpoint of a network link of a network access element and comprising a link buffer supporting a flow queue for a transport flow of a transport connection between a transport flow sender and a transport flow receiver, packets of the transport flow, wherein the virtualized link endpoint of the network link is separated from the network access element;
monitor a saturation state of the flow queue for the transport flow of the transport connection; and
send, from the virtualized link endpoint toward the transport flow sender via an off-band signaling channel, an indication of the saturation state of the flow queue for the transport flow of the transport connection.

* * * * *